Aug. 19, 1969
J. R. IKNER
3,461,477
HEATED WIPER BLADE
Filed Jan. 30, 1968
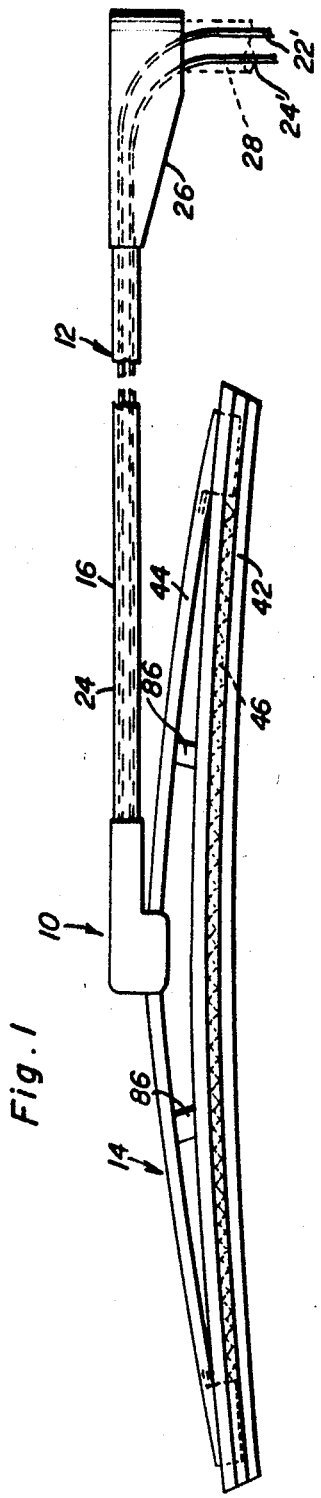
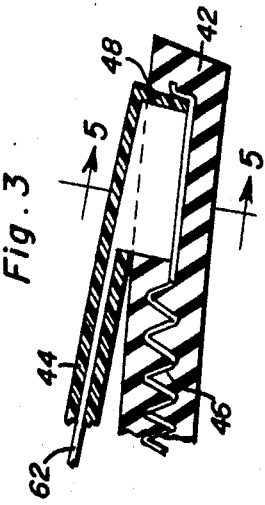
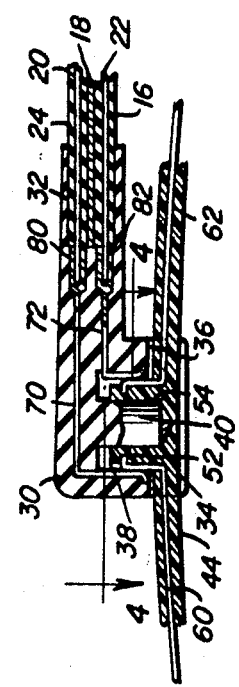
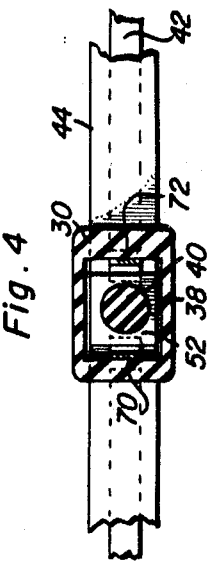
Jimmie Ray Ikner
INVENTOR.

United States Patent Office

3,461,477
Patented Aug. 19, 1969

3,461,477
HEATED WIPER BLADE
Jimmie Ray Ikner, Rte. 2, Box 139,
Henderson, N.C. 27536
Filed Jan. 30, 1968, Ser. No. 701,681
Int. Cl. B60s 1/04, 1/34; A47l 1/16
U.S. Cl. 15—250.06                                              4 Claims

ABSTRACT OF THE DISCLOSURE

The combination of a wiper arm including insulated conductor means extending therealong and a windshield wiper blade including an elongated rubber blade portion having an elongated longitudinally extending electrical resistance heating element embedded therein and an elongated generally arcuate mechanical backing member for the blade member supporting the latter at its opposite end. The backing member includes insulated conductor means extending from an area spaced generally centrally intermediate the opposite ends thereof to the opposite ends of the backing member with the remote ends of the insulated conductor means of the backing member electrically connected to the opposite ends of the electrical resistance heating element and the blade member and the mechanical backing member being removably supported from the arm member with the conductor means of the arm member and the conductor means of the backing member being electrically connected at the juncture between the backing member and the arm member.

---

The heated wiper blade of the instant invention is constructed in a manner whereby it may not only perform the function of sweeping wiper and slush or snow from the windshield of an associated vehicle but also provide a means for applying heat to the outer surface of the associated windshield in the area thereof swept by the associated wiper blade. In addition, since the wiper blade is operable to apply heat to the outer surface of the associated windshield it is of course warmed to the extent that ice and snow will not build up thereon.

In most instances where the outside temperature is considerably below freezing, precipitation occurs only in the form of snow and there is very little danger of such snow building up in the form of ice on either the outer surface of a vehicle windshield or the windshield wiper blade. Of course, when the temperature is at least several degrees above freezing, precipitation may be in the form of rain, snow or sleet but there is still very little possibility of ice building up on the outer surface of the associated windshield or the windshield wiper blade. Thus, conditions exist wherein ice may build up on the outer surface of a windshield or the windshield wiper arm of the vehicle only when the temperature is reasonably close to the temperature at which water freezes. If the outside air is at a temperature too much below the temperature at which water freezes, precipitation in the form of snow does not melt to any extent upon contact with either the windshield or windshield wiper of the associated vehicle and therefore may be blown or swept away without any build up of ice being possible.

Accordingly, the heated wiper blade of the instant invention need not be capable of producing more than reasonable quantities of heat sufficient only to prevent the build up of ice on the wiper blade and to somewhat warm the outer surface of an associated windshield in order to prevent the build up of ice thereon as the wiper blade is swung across the windshield.

The main object of this invention is to provide a heated wiper blade which will be capable of developing sufficient heat to prevent the build up of ice thereon as well as the build up of ice on the swept area of an associated windshield.

Another object of this invention is to provide a heated wiper blade in accordance with the immediately preceding object and whose mechanical functioning capacity will not be limited or reduced by the inclusion of an electrical resistance heating means thereto.

Yet another object of this invention provides a windshield wiper arm for use in conjunction with the heated wiper blade of the instant invention with the arm and blade including coacting projection and recess means releasably engageable with each other in order to form a supporting connection between the arm and the wiper blade as well as requisite electrical connection between the wiper blade and arm.

Another object of this invention is to provide a wiper arm including longitudially extending conductor means adapted to have electrical connections with axially extending conductor means extending through a hollow shaft portion upon which the end of the wiper arm remote from the blade is mounted.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an assemblage including the wiper arm and blade members of the instant invention;

FIGURE 2 is an enlarged fragmentary longitudinal sectional view taken substantially upon a plane passing through the center of the releasable connection defined between the wiper blade member and the wiper arm;

FIGURE 3 is a fragmentary enlarged longitudinal sectional view taken generally upon a plane passing through the center of the mechanical and electrical connection between the opposite ends of the blade member and the mechanical backing member therefor;

FIGURE 4 is a fragmentary sectional view taken substantially upon the plane indicated by the section line 4—4 of FIGURE 2; and FIGURE 5 is a transverse sectional view taken substantially upon a plane indicated by the section line 5—5 of FIGURE 3.

Referring now more specifically to the drawings, the numeral 10 generally designates the wiper arm and blade combination of the instant invention. The combination 10 includes an arm assembly referred to in general by the reference numeral 12 and a blade assembly referred to in general by the reference numeral 14. The arm assembly 12 includes an elongated body 16 which may consist of a plurality of superimposed plies 18 secured together and a pair of upper and lower elongated conductors 20 and 22 overlie and underlie the upper and lower plies 18, respectively. Further, the body 18 includes a tubular coating or covering 24 in which the plies 18 and conductors 20 and 22 are enclosed. The plies 18 are preferably constructed of non-conductive material and the coating 24 is also constructed of non-conductive material.

The base 10 of the body 16 includes a fitting 26 into which the body 16 is telescoped. The conductors 20 and 22 project outwardly of the base end of the body 16 and include extensions 22′ and 24′ adapted to extend through a hollow wiper motor shaft 28 over which the fitting 26 is telescoped for support therefrom.

A second L-shaped fitting 30 is provided on the head end of the body 16 and includes a bore 32 in the long leg portion thereof into which the head end of the body 16 is telescoped. The free end of the short leg of the fitting 30 includes a pair of opposite side extensions 34 between which there is defined a channel 36 and the short leg of the fitting 30 also defines a rectangular recess 38 opening outwardly into the channel 36 and in which a projection 40 is disposed. The projection 40 extends lengthwise outwardly from the bottom of the recess 38 and projects slightly into the channel 36.

The blade assembly 14 includes an elongated flexible blade member 42 which is generally conventional in configuration and the blade member 42 includes an elongated mechanical backing member 44.

The blade member 42 is constructed of non-conductive material and has elongated resistance heating element 46 embedded therein. The elongated and arcuate backing member 44 may be constructed of any suitable non-conductive material such as plastic and includes a pair of opposite end portions 48 defining laterally opening channels 50 in which the corresponding end portions of the blade member 42 are secured. The side walls of the channels 50 are outwardly convergent and therefore the portions of the blade member 42 disposed in the channels 50 are frictionally retained therein.

The blade member 44 includes a projection 52 centrally intermediate its opposite ends which extends away from the side of the backing member 44 remote from the blade member 42 and is of complementary rectangular cross-sectional shape to be received in a recess 38. The projection 52 includes a center bore 54 in which the projection 40 is receivable when the projection 52 is disposed in the recess 38 and the backing member 44 includes a pair of conductors 60 and 62 including corresponding ends disposed exteriorly of opposite sides of the projections 52 and a second set of corresponding ends extending down into the adjacent ends of the blade member 42 for electrical connection with the corresponding ends of the resistance heating element 46.

The fitting 30 includes a pair of conductors 70 and 72 extending therethrough terminating in one pair of corresponding ends in opposite sides of the recess 38 for electrical connection with the conductors 60 and 62. The other pair of ends of the conductors 70 and 72 terminate in sockets 80 and 82 opening outwardly of the bottom of recess 32 and in which extended end portions of the conductors 20 and 22 projecting outwardly of the head end of the body 16 are receivable for electrical connection with the conductors 70 and 72.

The extensions 34 may include inwardly projecting free end portions to slightly underlie the central portion of the mechanical backing member 44 although the frictional engagement of the projection 52 in the recess 38 and the projection 40 in the bore 54 is sufficient to frictionally retain the backing member 44 supported from the fitting 32. In addition, the frictional connection between the head end of the body 16 and the fitting 30 is sufficient to maintain the latter supported from the body 16.

In operation, the fitting 26 is removably secured over the extended end of the tubular shaft 28 with the extensions 22' and 24' projecting through the shaft 28 and the fitting 26 properly orientated relative to the shaft 28. Thereafter, the extensions 22' and 24' may be electrically connected to any suitable source of electrical potential through a rheostat switch having an off position. Thereafter, the blade member 42 may be heated as desired upon completion of the electrical circuit between the resistance heating element 46 and the source of electrical potential through the aforementioned rheostat switch. If desired, the mechanical backing member 44 may include short depending legs 86 disposed between the projection 52 and the opposite ends of the backing member 44 for engagement with intermediate portions of the blade member 42.

What is claimed as new is as follows:

1. In combination, an elongated wiper blade assembly, an elongated wiper arm assembly including a base end and a head end, means on said base end adapting said base end for securement to a wiper motor shaft, said wiper blade assembly including an elongated wiper blade member constructed of resilient non-conductive material, an elongated electrical resistance-type heating element extending longitudinally of said blade member in good heat transfer relation therewith, said wiper arm assembly including insulated conductor means extending from said head end thereof to said base end thereof and said wiper blade assembly including insulated conductor means extending from the opposite ends thereof to the point of connection of said wiper blade assembly with said head end of said wiper arm assembly the conductor means at opposite ends of said blade assembly being electrically connected to the opposite ends of said electrical resistance-type heating element and the conductor means in said head end of said wiper arm assembly including means deconnected to said blade assembly conductor means, said head end of said wiper arm assembly inclding means defining a socket opening toward said blade assembly and the latter including a projection telescoped in said socket said projection including an endwise outwardly opening elongated recess and said socket including an endwise outwardly extending essentially disposed shank telescopingly disposed in said recess, said conductor means in said wiper arm assembly opening into said socket and said conductor means of said blade assembly projecting outwardly from said projection for electrical contact with a portion of said conductor means disposed in said socket.

2. In combination, an elongated wiper blade assembly, an elongated wiper arm assembly including a base end and a head end, means removably securing said head end of said arm assembly to said blade assembly intermediate its opposite ends, means on said base end adapting said base end for securement to a hollow wiper motor shaft, said wiper blade assembly including an elongated wiper blade member constructed of resilient non-conductive material, an elongated electrical resistance-type heating element extending longitudinally of said blade member in good heat transfer relation therewith, an elongated backing member generally paralleling and extending along said blade member and secured at its opposite ends to corresponding end portions of said blade member, said wiper arm assembly including insulated conductor means extending from said head end thereof to said base end thereof and including conductor means extensions adapted to extend through said hollow shaft, said backing member including insulated conductor means extending from the opposite ends thereof to the point of connection of said backing member with said head end of said wiper arm assembly, the conductor means at opposite ends of said backing member being electrically connected to the opposite ends of said electrical resistance-type heating element and the conductor means in said head end of said wiper arm assembly being electrically connected to said backing member conductor means, said head end of said wiper arm assembly including means defining a socket opening toward said backing member and the latter including a projection telescoped in said socket, said projection including an endwise outwardly opening elongated recess and said socket including an endwise outwardly extending centrally disposed shank telescopingly disposed in said recess, said conductor means in said wiper arm assembly opening into said socket and said conductor means of said backing member projecting outwardly from said projection for electrical contact with the portions of said conductor means disposed in said socket.

3. The combination of claim 1 wherein said wiper arm assembly includes an elongated body portion and said head end of said arm assembly comprises a fitting including a blind bore into which the adjacent end of said body is telescoped, said conductor means of said arm assembly including socket means opening outwardly into the bottom of said bore and extended end portions of conductors projecting outwardly from the adjacent end of said body telescoped into said socket means.

4. In combination, an elongated wiper blade assembly, an elongated wiper arm assembly including a base end and a head end, means removably securing said head end of said arm assembly to said blade assembly intermediate its opposite ends, means on said base end adapting said base end for securement to a hollow wiper motor shaft, said wiper blade assembly including an elongated wiper blade member constructed of resilient non-conductive material, an elongated electrical resistance-type heating element extending longitudinally of said blade member in good heat transfer relation therewith, an elongated backing member generally paralleling and extending along said blade member and secured at its opposite ends to corresponding end portions of said blade member, said wiper arm assembly including insulated conductor means extending from said head end thereof to said base end thereof and including conductor means extensions adapted to extend through said hollow shaft, said backing member including insulated conductor means extending from the opposite ends thereof to the point of connection of said backing members with said head end of said wiper arm assembly, the conductor means at opposite ends of said backing member being electrically connected to the opposite ends of said electrical resistance-type heating element and the conductor means in said head end of said wiper arm assembly being electrically connected to said backing member with said head end of said wiper arm bly including an elongated body portion and said head end of said arm assembly comprising a fitting including a blind bore into which the adjacent end of said body is telescoped, said conductor means of said arm assembly including socket means opening outwardly into the bottom of said bore and extended end portions of conductors projecting outwardly from the adjacent end of said body telescoped into said socket means, said head end of said wiper arm assembly including means defining a socket opening toward said backing member and the latter includes a projection telescoped in said socket, said projection including an endwise outwardly opening elongated recess and said socket including an endwise outwardly extending centrally disposed shank telescopingly disposed in said recess.

References Cited

UNITED STATES PATENTS

| | | | |
|---|---|---|---|
| 1,719,006 | 7/1929 | Fogland | 15—250.09 XR |
| 2,106,148 | 1/1938 | Kellner | 287—126 XR |
| 2,550,504 | 4/1951 | Vidrick et al. | 15—250.06 |
| 2,677,143 | 5/1954 | Blaney | 15—250.06 |
| 3,195,161 | 7/1965 | Haluck et al. | 15—250.06 |

PETER FELDMAN, Primary Examiner

U.S. Cl. X.R.

15—250.32, 250.42